United States Patent [19]
Tendler

[11] Patent Number: 6,014,555
[45] Date of Patent: Jan. 11, 2000

[54] SYSTEM FOR PROVIDING THE TELEPHONE NUMBER OF A TELEPHONE MAKING AN EMERGENCY CALL

[75] Inventor: Robert K. Tendler, Chestnut Hill, Mass.

[73] Assignee: Tendler Cellular, Inc., Boston, Mass.

[21] Appl. No.: 08/667,398

[22] Filed: Jun. 21, 1996

[51] Int. Cl.[7] ..................................... H04Q 7/38

[52] U.S. Cl. ........................... 455/404; 455/563; 379/51; 379/88.16

[58] Field of Search ..................................... 455/403, 404, 455/556, 563, 564, 575; 379/49, 88.16, 142, 51, 45, 38, 67, 355, 88

[56] References Cited

U.S. PATENT DOCUMENTS

| | | | |
|---|---|---|---|
| 5,109,399 | 4/1992 | Thompson | 379/49 |
| 5,388,147 | 2/1995 | Grimes | 455/404 |
| 5,553,125 | 9/1996 | Martensson | 379/142 |
| 5,555,286 | 9/1996 | Tendler | 379/51 |
| 5,604,790 | 2/1997 | Grimes | 379/142 |
| 5,604,794 | 2/1997 | Vogel et al. | 379/88.16 |

*Primary Examiner*—Edward F. Urban
*Attorney, Agent, or Firm*—Robert K. Tendler

[57] ABSTRACT

An infrastructureless system is provided for automatically providing the telephone number of the phone making an emergency call by utilizing a synthetic voice announcement of the phone number during the emergency transmission from the phone, thereby to eliminate infrastructure involved in providing the telephone number to the recipient of the emergency call.

1 Claim, 1 Drawing Sheet

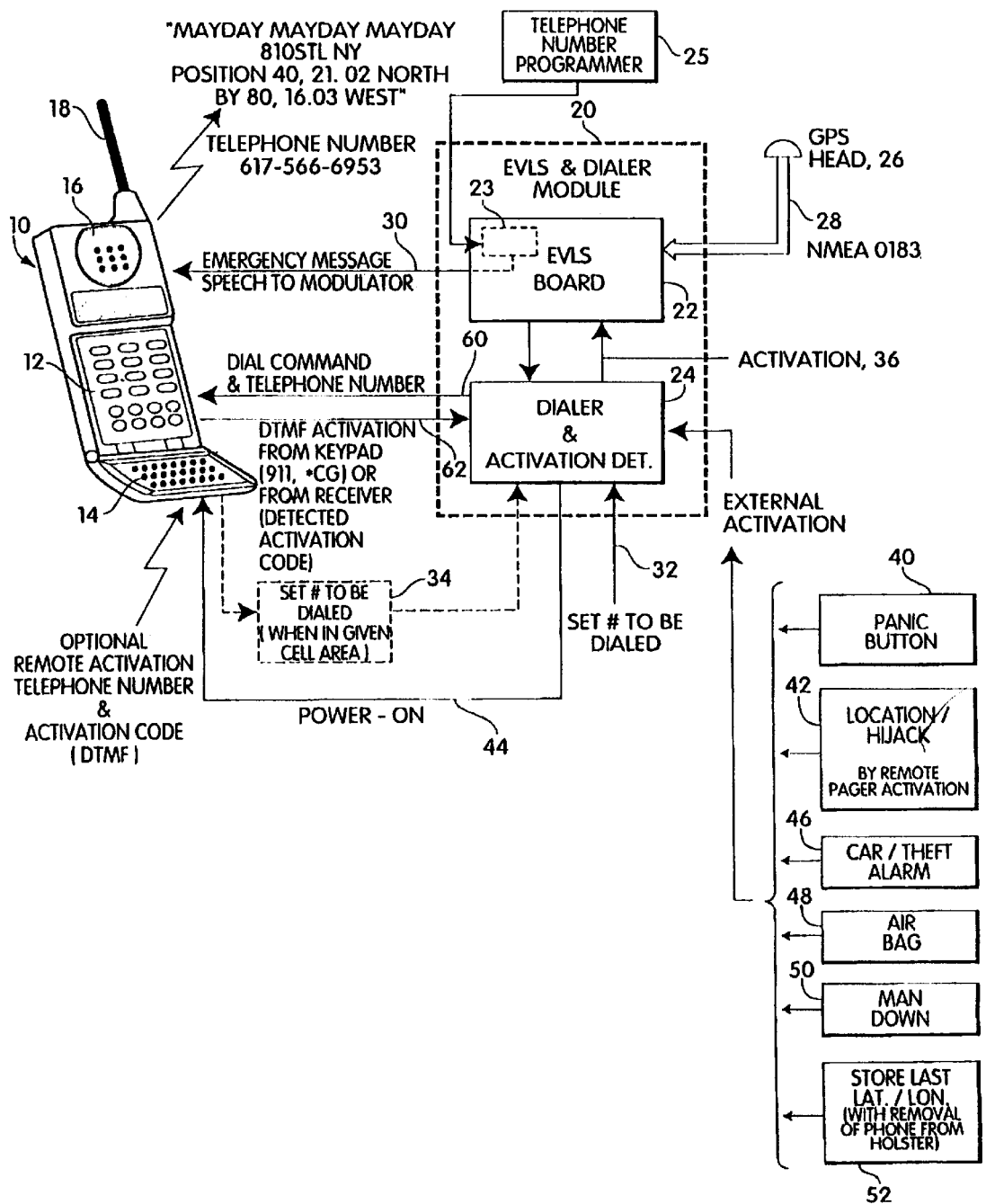

006,014,555

SYSTEM FOR PROVIDING THE TELEPHONE NUMBER OF A TELEPHONE MAKING AN EMERGENCY CALL

FIELD OF INVENTION

This invention relates to emergency signalling and more particularly to the provision of the identity of the caller by reporting the associated telephone number without additional infrastructure.

BACKGROUND

During the calling of 911 to initiate an emergency call to a Public Service Access Point or PSAP, it is only with difficulty that the telephone number of phone which is making the emergency call can be ascertained. Although the ANI or Automatic Number Identification can, in some instances, be obtained through signalling from the particular cellular phone involved, only massive changes to carrier cell sites and infrastructure will provide a universal solution to a problem plaquing the public safety community. The requirement for the phone number of the phone placing the call is now mandatory in order to enable emergency personnel to call back a stricken individual in the case of a dropped call which happens frequently. Without the ability to speak to the caller, his condition or problem cannot be ascertained.

Note that when a cellular phone is turned on, every six to eight seconds it outputs its ESN or electronic serial number. For each carrier, when a cellular phone is activated, the carrier assigns a Mobile Indentification Number or MIN. When the SEND key is depressed, the phone sends out both the ESN and the MIN. Thereafter, the carrier's switch verifies that the MIN is associated with the ESN for billing purposes.

While the MIN is available at the switch at the time the call is placed, because of the multiplicity of systems, ascertaining the MIN and transmitting it to the PSAP is all but impossible without massive infrastructure changes.

Note that at the present time, there are no standards for MIN reporting, as the system has been developed on an adhoc basis. The Cellular Telecommunications Industry Association estimates eight years to have standards and infrastructure in place in order to meet the requirements to report the mobile caller's telephone number to the appropriate PSAP.

Representative systems for determining the MIN are as follows: The most common arrangement now in place for reporting any telephone number to the appropriate PSAP, although not the actual phone number of the caller, according to the Jun. 1996 15th Annual Conference of the National Emergency Number Association is that upon receipt of a telephone call from a cellular phone, the cell site assigns the call a ten digit telephone number from a list of phone numbers provided by the state. The purpose of this telephone number is to identify the cell site receiving the call, not the caller's telephone number. Then, the cell site transmits a "911 send" signal to the Mobile Telephone Switch Office or MTSO from the cell site, with the 10 digit telephone number or TN then transmitted to the Local Exchange Carrier or LEC Central Office or Access Tandem. This office then routes the call to the appropriate E-911 Tandum Switch that routes the call to the nearest PSAP under control of a Data Management System. Simultaneously, the LEC Central Office separately transmits the 10 digit Admin TN to the PSAP. Here, the 10 digit telephone number is merely used to identify the receiving cell site to obtain the general area from which the emergency call was initiated. While some PSAPS attempt to use this 10 digit Admin TN to try to contact the caller, this is only done with difficulty, if at all.

A second system for reporting the telephone number of the cell site, but not the caller's telephone number relies on a Psuedo-ANI or Psuedo Automatic Number Identifier that is not assigned by the state, but rather by the carrier and is generated at the receiving cell site. This number is provided to the MTSO which, in turn, is routed as the ANI to the 911-Tandem. The Psuedo-ANI is processed by the E-911 Tandem to transmit to the PSAP the pseudo telephone number, carrier name, cell cite address, cell site latitude and longitude, roam access number, serving radius and sector bearing. Again, the telephone number of the caller is not reported, with the reported phone number merely identifying the location of the receiving cell site.

A third system provides the real ANI, i.e. the real telephone number of the caller, with the real ANI coming from the cellular phone. Note, the psuedo ANI is also generated at the cell site at this time. The "911-send" is transmitted to the LEC Central Office, with the LEC Central Office being provided with the psuedo-ANI, the real ANI, and the Feature Group D or SS7 trunk. As a result, the LEC Central Office provides the PSAP with the Real ANI, the Pseudo ANI and a psuedo automatic location indication or ALI derived from knowing which cell site received the call. While the real ANI permits a call back to the caller by the PSAP, having the phone digitally provide its telephone number, suffers not only from infrastructure costs, but also from problems surrounding the fact that there is no commonly agreed-upon format. Thus, the system is not universal until such time as all carriers and all phone manufacturers agree on a format such as CDPD, CDMA, TDMA, or FDMA, e.g. respectively cellular digital packet data, code division multiplexing, time division multiplexing, or frequency division multiplexing.

A fourth system adds actual location information calculated from triangulation from different cell sites, while providing the PSAP with the real ANI, the psuedo ANI, the pseudo ALI, and both the latitude and longitude and speed/direction of the cellular phone. Also provided is the subscriber name and subscriber home address.

A fifth system provides all of the information of the fourth system described above, but derives latitude and longitude from GPS satellites, with the latitude and longitude being digitally transmitted to the cell site, which is, in turn, relayed to the PSAP.

It will be appreciated that all of the above approaches to providing the PSAP with the telephone number of the caller is infrastructure intense, requiring major changes to switches at the cell sites, major additions to the MTSO and LEC Central Office and major additions to databases. Moreover, providing either the 10 digit TN or pseudo ANI's is, at best, confusing and, at worst, can result in a wrong telephone number being dialed by the PSAP if the cellular phone moves to a different cell site.

The result is massive infrastructure changes and years to implement, to say nothing of the compatibility of networks from state to state, or even between different carriers in the same geographic area.

Thus, since there are numerous different ways of obtaining the caller's telephone number, all involving changes to cell site switches, complicated computer interfaces, and billing related issues, there is no universal way of ascertaining the number of the telephone making the emergency call, especially at the PSAP where it is required.

As a result, frustration abounds when a cellular phone call to a PSAP is dropped since there is no way for the PSAP to reestablish the communication link between the PSAP and the stricken individual. Moreover, the identity of the individual owning the phone is not known since the telephone number of the telephone cannot be ascertained at the PSAP.

It is therefore paramount to be able to provide a simplified universal system for providing the PSAP with the telephone number of the calling party so that both interrupted emergency communications can be reestablished and the identity of the owner of the particular phone making the cellular phone call can be reported to the PSAP.

SUMMARY OF THE INVENTION

In order to solve the problem of providing the telephone number of the phone calling the PSAP, in one embodiment, the telephone number of the calling telephone is provided by a synthetic voice announcement from a speech synthesizer at the phone which announces to the PSAP at some time during the emergency transmission what the telephone number is. It will be appreciated that through the utilization of a speech synthesizer, no infrastructure is required between the phone making the transmission and the recipient of the emergency message, namely dispatchers or other personnel at a central dispatch office, whether that central dispatch office be at a PSAP or elsewhere.

The subject system thus eliminates the requirement for infrastructure or, in fact, any kind of common format between the carriers to establish the telephone number of the calling phone.

In one embodiment, the speech synthesizer is carried in a unitary handheld unit along with a GPS receiver from which the latitude and longitude of the phone can be ascertained and called out with the call out of the cell phone number.

For purposes of the present invention, its description will be in terms of the cellular phone network for convenience. However, the subject system is not limited to cellular phones, but rather is applicable to all wireless phones where it is important to quickly and inexpensively ascertain the phone number, whether during an emergency transmission or not.

In summary, an infrastructureless system is provided for automatically providing the telephone number of the phone making an emergency call by utilizing a synthetic voice announcement of the phone number during the emergency transmission from the phone, thereby to eliminate infrastructure involved in providing the phone number to the recipient of the emergency call.

BRIEF DESCRIPTION OF THE DRAWINGS

The sole drawing FIGURE is a diagrammatic representation of a cellular phone equipped with a speech synthesizer and CPU for causing an emergency message to include the call out of the telephone number of the cellular phone for use by the appropriate PSAP.

DETAILED DESCRIPTION

As will be seen from the sole drawing FIGURE, a cellular phone 10 includes a keypad 12, a microphone 14, and an earpiece 16 along with a suitable antenna 18. Coupled to the cellular phone is an EVLS and dialer module 20 which includes an EVLS module in the form of a printed circuit board 22 and a dialer and activation detector 24.

In one embodiment, module 20 is coupled between the keypad and the cellular phone transceiver to be able to interrupt selected keypad signals prior to transmission to the transceiver. This permits the module to respond to EVLS-related keypad actuation and to place the appropriate signals on the bus between the keypad and the transceiver. Thus the module can interrupt and replace keypad commands. It is noted that for some cellular phones the keypad controls a DTMF tone generator within the transceiver. By interrupting and altering the keypad signals to the tone generator within the transceiver, the functions attributed to the dialer and activation detector in module 20 can be duplicated. However, for convenience in describing the Subject System, it will be assumed that DTMF tones are generated by the keypad and are both detected at and generated in the module.

EVLS board 22 contains a speech synthesizer 23 driven by a telephone number programmer 25 which outputs a verbal rendition of the telephone number onto line 30 to modulate phone 10 during the emergency transmission. The telephone number of phone 10 is thus announced to the PSAP during the emergency transmission to give the PSAP a call back number in case of dropped call.

EVLS board 22 also contains a location detection circuit for detecting the location determined by a GPS 26 and transmitted to board 22 via an NMEA 0183 interface bus 28. The function of the location detection circuit is to derive a number which is then verbalized along with a message that is pre-encoded and provided to speech synthesizer 23 which synthesizes a predetermined message and provides it over line 30 to the modulation section of the telephone. While one purpose of the speech synthesizer is to call out latitude and longitude, its purpose in the subject invention is to call out the previously programmed telephone number of the telephone number.

Note that any conventional method of programming the speech synthesizer with the telephone number is within the scope of this invention, with the speech being delivered over line 30 to modulate the cellular phone transmission.

It will be appreciated that location detection and speech synthesis is now commonplace and is available from ACR Electronics, Inc. of Ft. Lauderdale, Fla. as ACR Model No. EVLS-1000.

It is the purpose of the EVLS board to decode location and to provide the emergency message which includes the fact of an emergency and the location of the vehicle/vessel or person at which the EVLS and dialer module is located as well as the telephone number of the caller.

This message along with the telephone number may be repeated once or as many times as required, with the message being terminated either on a time basis, by the actuation of any key in the keypad 12, or even by voice operated relays or voice commands should such be desired.

In order to activate the EVLS board, dialer and activation detector 24 includes a DTMF detector for detecting DTMF tones or equivalent bus signals from keypad 12. It also can be made to respond to any DTMF tones available from the audio output circuit of the phone which are sent from a remote location to the cellular phone, such as a predetermined code to have the system dial a predetermined number to give the location of the vehicle/vessel or person. Conventional programming determines which DTMF tones will be acted upon and the consequence of the action.

Upon detection of DTMF tones or equivalent bus signals which cause the activation of the unit, the dialer portion causes the cellular phone to go off hook and dial the telephone number that has been preset into the dialer. This number can be preset in any number of conventional ways as illustrated at 32 or, optionally, as illustrated at 34, the number to be dialed can be obtained by receipt of remotely generated signals transmitted to the cellular phone transceiver such that the number to be dialed can be determined, for instance, by a predetermined signal from a cell site within range of the cellular phone.

It will be appreciated that remote activation of the Subject System can be accomplished, assuming the cellular phone is turned on, by the dialing of the cellular phone number and the transmission of predetermined DTMF activation tones which are detected by activation detector 24.

The result of the activation of module 20 is that a message is verbally broadcast, such as the message "MAYDAY MAYDAY MAYDAY ... NY810RYF ... Position 40.21.02 North by 80.16.23 West". It will be appreciated that such information can be readily written down by hand and the position of the cellular phone determined by plotting this position on a conventional map.

It will also be appreciated that upon activation, an activation signal 36 from detector 24 is applied to EVLS board 22 such that upon providing an off-hook condition for the cellular phone, the EVLS board is actuated to modulate the modulator section of the transmitter for the cellular phone.

In one embodiment, external activation of module 20 is provided by a number of different activation signals. The result however of such external activation is the same in that the dialer and activation detector 24 detects the external activation signal and causes the telephone to go off-hook and to dial the appropriate number, thereafter activating the EVLS board to modulate the transmitter section of the cellular phone with the appropriate emergency message.

Such external activation can be, for instance, a panic button 40 carried anywhere on the vehicle or person which causes the cellular phone to transmit the position of the cellular phone upon actuation.

Secondly, as illustrated at 42, the location of a vehicle or person can be obtained by a remote pager activation. This subsystem can also be actuated by a hijack victim who calls a pager number to have the cellular phone "call home". The purpose of pager activation is to be able to turn on the cellular phone as illustrated at 44 should the phone be off. While it is possible to provide cellular phones which are hardwired to the battery and left on, this is not the usual case. Rather, by utilizing a low current draw pager receiver, the cellular phone can be turned on and module 20 activated to have the cellular phone call back to the preloaded number with the location.

As illustrated at 46, traditional car theft alarms can be utilized to activate the cellular phone, including a turn-on function, whereas an airbag as illustrated at 48 upon deployment may be utilized to activate the system.

As illustrated at 50, a man down type of activation is appropriate for personally carried cellular phones in which, when a stricken officer falls to the ground, an activation signal is provided to module 20. Of course, the man down activation can be by separate button or switch on the person.

As illustrated at 52, if the cellular phone is in a holster, then upon removal of the phone from the holster, the cellular phone may be made to store the last latitude and longitude and then call a predetermined number for indicating an emergency situation.

The ability to store the last latitude and longitude applies whether or not a holder-based system is used for the cellular phone. For individuals wishing to steal a car or to hijack it, their first line of defense may be to rip off the GPS antenna, LORAN antenna, or in fact, any other piece of equipment related to location detection. Should this be done, module 20 nonetheless stores the last latitude and longitude which provides at least a starting point for the search being established by the broadcast of this position.

It will further be appreciated that the apparatus illustrated in boxes 40–52 is commercially available and that each function to produce an external activation signal is well known. Furthermore, activation by either a panic button, a location/hijack unit, a car theft alarm, an airbag, a man down detector or in fact any external activation can be utilized to provide a power-on signal to the cellular phone should the cellular phone not already be on. Whether it is the depressing of a button, the switching of a switch, the detection of an airbag deployment, or activation by a remote means such as a pager, the external activation nevertheless can be made to place a signal on power-on line 44 to make sure that the cellular phone is in fact on.

It will be appreciated that a bus comprising lines 60 and 64 is provided between keypad 12, module 20 and the remainder of the cellular phone transceiver. Thus the number to be dialed and the off-hook condition can be established through signalling over line 60 which provides the DTMF tones or equivalent bus commands to the transceiver as well as an off-hook or dialing command.

Likewise as illustrated at 62, activation either from the keypad or from remotely generated DTMF tones, is coupled directly to the dialer and activation detector 24. This being the case, any predetermined DTMF activation code, detected by the activation detector through its DTMF detection circuits, can be utilized in the actuation of the system.

While the Subject System has been described in connection with cellular phones, it will be appreciated that the Subject System has application to any phone system, be it cellular, satellite or land line based.

Having above indicated a preferred embodiment of the present invention, it will occur to those skilled in the art that modifications and alternatives can be practiced within the spirit of the invention. It is accordingly intended to define the scope of the invention only as indicated in the following claims.

I claim:

1. A method for eliminating additional infrastructure requirements in the report of the telephone number of a wireless phone placing an emergency call to emergency personnel at a public service access point in which the call is placed over a network which supports verbal communication to permit the call back to said wireless telephone in the event of a dropped or terminated call, comprising the steps of:

synthetically generating a verbal non-digital rendition of the telephone number of said wireless telephone at said wireless telephone; and, transmitting said verbal rendition of said telephone number from said wireless telephone to said public service access point during said emergency call, whereby said emergency personnel are appraised of said telephone number during aural receipt thereof without the requirement of additional digital apparatus either at said public service access point or said network.

* * * * *